(12) United States Patent  (10) Patent No.: US 8,652,287 B2
Takeuchi  (45) Date of Patent: Feb. 18, 2014

(54) APPARATUS AND METHOD FOR POSITIONING AN OPTICAL DEVICE

(75) Inventor: Kenichiro Takeuchi, North Brunswick, NJ (US)

(73) Assignee: Go!Foton Holdings, Inc., Somerset, NJ (US)

( * ) Notice: Subject to any disclaimer, the term of this patent is extended or adjusted under 35 U.S.C. 154(b) by 63 days.

(21) Appl. No.: 13/177,691

(22) Filed: Jul. 7, 2011

(65) Prior Publication Data

US 2013/0008597 A1  Jan. 10, 2013

(51) Int. Cl.
*B29C 65/00* (2006.01)

(52) U.S. Cl.
USPC .......................... 156/293; 385/136; 385/137

(58) Field of Classification Search
USPC ............... 156/293, 294; 385/136, 137, 53–94
See application file for complete search history.

(56) References Cited

U.S. PATENT DOCUMENTS

| | | | |
|---|---|---|---|
| 4,060,309 A | 11/1977 | Le Noane et al. | |
| 4,838,639 A | 6/1989 | Morankar et al. | |
| 5,011,246 A | 4/1991 | Corradetti et al. | |
| 5,631,987 A | 5/1997 | Lasky et al. | |
| 5,668,906 A * | 9/1997 | Yamamura et al. | 385/83 |
| 5,764,833 A | 6/1998 | Kakii et al. | |
| 6,282,339 B1 | 8/2001 | Zheng | |
| 6,335,993 B1 | 1/2002 | Takahashi | |
| 6,758,611 B1 | 7/2004 | Levin et al. | |
| 7,270,488 B2 | 9/2007 | Althaus et al. | |
| 7,296,939 B2 | 11/2007 | Sonoda et al. | |
| 7,334,947 B2 | 2/2008 | Rose et al. | |
| 7,347,631 B2 | 3/2008 | Suzuki et al. | |
| 7,382,949 B2 | 6/2008 | Bouma et al. | |
| 7,672,551 B2 | 3/2010 | Ji | |
| 7,794,159 B2 | 9/2010 | Grapov et al. | |
| 2004/0264883 A1 | 12/2004 | Althaus et al. | |
| 2005/0025418 A1 | 2/2005 | Brown | |
| 2005/0129381 A1* | 6/2005 | Zbinden | 385/137 |
| 2005/0238297 A1 | 10/2005 | Saitoh | |
| 2006/0018609 A1 | 1/2006 | Sonoda et al. | |
| 2006/0182390 A1 | 8/2006 | Ji | |
| 2007/0147743 A1 | 6/2007 | Chen et al. | |
| 2007/0165985 A1 | 7/2007 | Rose et al. | |
| 2008/0285918 A1 | 11/2008 | Sonoda | |
| 2009/0092358 A1 | 4/2009 | Watanabe et al. | |
| 2010/0166366 A1 | 7/2010 | Grapov et al. | |

* cited by examiner

FOREIGN PATENT DOCUMENTS

JP  2007286386 A  * 11/2007

OTHER PUBLICATIONS

International Search Report and Written Opinion for Application No. PCT/US2012/045666 dated Oct. 2, 2012.

*Primary Examiner* — Katarzyna Wyrozebski Lee
*Assistant Examiner* — Carson Gross
(74) *Attorney, Agent, or Firm* — Lerner, David, Littenberg, Krumholz & Mentlik, LLP

(57) ABSTRACT

An apparatus for positioning an optical device includes (i) a holder assembly for holding an optical device and for limiting movement of the optical device within the holder assembly to movement in the Z-direction and (ii) a housing for permitting limited movement of the holder assembly in the X-direction, for supporting and optionally permitting movement of the holder assembly in the Y-direction, for supporting and for substantially preventing movement of the holder assembly in the Z-direction. When the holder assembly optionally holding the optical device is positioned within the housing to obtain a desired position of the optical device, a bonding material may be used for fixing the location in the X-direction, and optionally the Y-direction, of the holder assembly within the housing. A method of operating the apparatus for obtaining a desired position of an optical device is further provided.

9 Claims, 7 Drawing Sheets

APPARATUS AND METHOD FOR POSITIONING AN OPTICAL DEVICE

FIELD OF THE TECHNOLOGY

The present invention relates to devices and methods for positioning optical devices, and in particular it relates to devices and methods for maintaining an optical device at a desired position.

BACKGROUND OF THE INVENTION

Precision in positioning an optical device, such as an optical energy signal transmitting device, for example, a laser, or an optical energy signal receiving or conveying device, at a desired position, and providing that the optical device is maintained at the desired position during use of the optical device, are crucial in achieving efficacy and reliability of the optical device during use.

In the prior art, various assemblies are available to hold an optical device and fix the device at a desired position within the assembly. For example, an optical device holding assembly may be in the form of a cylindrical sleeve in which a center axis of the sleeve may be fixed eccentrically with a center axis of a separate cylindrical holder along a longitudinal axis. The sleeve, which holds the optical device, may be adjusted in a direction transverse to the longitudinal axis as well as in a direction parallel to the longitudinal axis, to position the optical device.

In some optical device holding assemblies, the optical device is held within a holding component, such as a sleeve, that is movable to obtain a desired position of the optical device, and then attached to a support element using an adhesive, such as an epoxy, to maintain the holding component, and thus the optical device held therein, fixed at the desired position. Optical devices within such assemblies, however, typically are exposed to humidity and temperature conditions that may cause swelling, creeping, or a reduction in the bonding strength of adhesives typically used in such holding assemblies. Such degradation of the adhesives, over time, may cause failure of bonds between the holding component and support element, eventually resulting in unwanted repositioning of the optical device.

Therefore, there exists a need for an assembly that may provide for positioning of an optical device at a desired position by translation of the optical device in any direction, and that may reliably maintain the optical device in the desired position.

BRIEF SUMMARY OF THE INVENTION

In accordance with an aspect of the invention, an apparatus for positioning an optical device may include a housing having a first member and a second member. Each member of the housing may have opposing first and second inner surfaces and an inset surface that define a slot region in each of the members. At least portions respectively of the first and second inner surfaces may be parallel and spaced apart a distance T, in which the portions of the four inner surfaces may extend in planes parallel to one another. The positioning apparatus may also include a holder assembly. The holder assembly may include a projection member having opposing surfaces and first and second flange members. Each flange member may have an end surface and opposing first and second surfaces that may extend from the opposing surfaces of the projection member. At least portions respectively of the first and second surfaces may be parallel and spaced substantially the distance T from each other. The opposing surfaces of the projection member may be capable of fitting between the first and second members. The housing may be adapted to receive the holder assembly in the slot regions such that the parallel surface portions of the first and second flange members face the parallel inner surface portions of the first and second members, respectively, when the holder assembly is in the slot regions and moved in a direction substantially parallel to the planes in which the inner surfaces of the first and second members extend.

In accordance with another aspect of the invention, an apparatus for positioning an optical device may include a housing having a first member and a second member. Each member may have opposing first and second inner surfaces, an inset surface and a base surface from which the inset surface and the inner surfaces extend that define a slot region in each member. At least portions respectively of the first and second inner surfaces may be parallel and spaced apart a distance T, in which the portions of the four inner surfaces may extend in planes parallel to one another. The positioning apparatus may also include a holder assembly. The holder assembly may include a projection member having opposing surfaces and first and second flange members. Each flange member may have an end surface and opposing first and second surfaces that extend from the opposing surfaces of the projection member. At least portions respectively of the first and second surfaces may be parallel and spaced a distance T from each other. The end surface of each flange member may include a first portion and a second portion and the opposing surfaces of the projection member may be capable of fitting between the first and second members. The housing may be adapted to receive the holder assembly in the slot regions such that, when the holder assembly is in the slot regions, at least a portion of the first and second flange members, respectively, faces at least a portion of the inner surfaces of the first and second members in which the first portion of the end surface of each flange member may be spaced further from the base surface and the inset surface of the housing adjacent to the end surface than the second portion of the end surface.

In accordance with another aspect of the invention, an apparatus for positioning an optical device may include a holder assembly having a projection member that extends along a longitudinal axis, and at least one flange member attached to the projection member. The flange member may have substantially parallel surfaces that extend in a direction substantially perpendicular to the longitudinal axis of the projection member. The positioning apparatus may also have a housing having at least one slot region. The at least one slot region may extend in a direction substantially perpendicular to a longitudinal axis of the housing and may be capable of receiving the at least one flange member. When the flange member is received in the slot region and the holder assembly is moved in a direction substantially perpendicular to the longitudinal axis of the housing, a portion of the substantially parallel surfaces may remain within the slot region. The projection member may be capable of fitting within an opening defined by the housing that extends from the slot region in a direction of the longitudinal axis of the housing and may be adapted to permit movement of the projection member in the direction perpendicular to the longitudinal axis of the housing.

In accordance with another aspect of the invention, a method of operating an apparatus for positioning an optical device may include the steps of inserting first and second flange members of a holder assembly for holding an optical device into respective slot regions of first and second members of a housing. Each member of the housing may have opposing first and second inner surfaces and an inset surface that define a slot region in each member. At least portions respectively of the first and second inner surfaces may be parallel and spaced apart a distance T, in which the portions of the four inner surfaces may extend in planes parallel to one another. The holder assembly may include a projection member having opposing surfaces and first and second flange members in which each flange member may have an end surface and opposing first and second surfaces that extend from the opposing surfaces of the projection member. The opposing surfaces of the projection member may be capable of fitting between the first and second members. At least portions respectively of the first and second surfaces may be parallel and spaced substantially the distance T from each other. The housing may be adapted to receive the holder assembly in the slot regions such that the parallel surface portions of the first and second flange members face the parallel inner surface portions of the first and second members, respectively, when the holder assembly is in the slot regions and moved in a direction substantially parallel to the planes in which the inner surfaces of the first and second members extend toward the inset surface of the first member or the second member. This method may also include the steps of moving the holder assembly in the direction of the inset surface of the first member or the second member to obtain a desired position of the holder assembly and applying a bonding material within a space between at least one of the inset surfaces and the end surface of the flange member opposing the inset surface when the holder assembly is in the desired position.

In accordance with another aspect of the invention, a method of operating an apparatus for positioning an optical device may include the step of inserting first and second flange members of a holder assembly for holding an optical device into respective slot regions of first and second members of a housing. Each member of the housing may have opposing first and second inner surfaces, an inset surface, and a base surface from which the inset surface and the inner surfaces extend that define the slot region in each member. At least portions respectively of the first and second inner surfaces may be parallel and spaced apart a distance T, in which the portions of the four inner surfaces may extend in planes parallel to one another. The holder assembly may include a projection member having opposing surfaces and first and second flange members. Each flange member may have an end surface and opposing first and second surfaces that extend from the opposing surfaces of the projection member. At least portions respectively of the first and second surfaces of each of the flange members may be parallel and spaced a distance T from each other. The end surface of each flange member may include a first portion and a second portion, and the opposing surfaces of the projection member may be capable of fitting between the first and second members. The housing may be adapted to receive the holder assembly in the slot regions such that, with the holder assembly in the slot regions, at least a portion of the first and second flange members, respectively, faces at least a portion of the inner surfaces of the first and second members in which the first portion of the end surface of each flange member may be spaced further from the base surface and the inset surface of the housing adjacent to the end surface than the second portion of the end surface. This method may also include the steps of moving the holder assembly in a direction toward or away from the base surface to obtain a desired position of the holder assembly and applying a bonding material within a space between the inset surface of the first and second members and the end surface of the first and second flange members, respectively.

DETAILED DESCRIPTION

Figure 1:
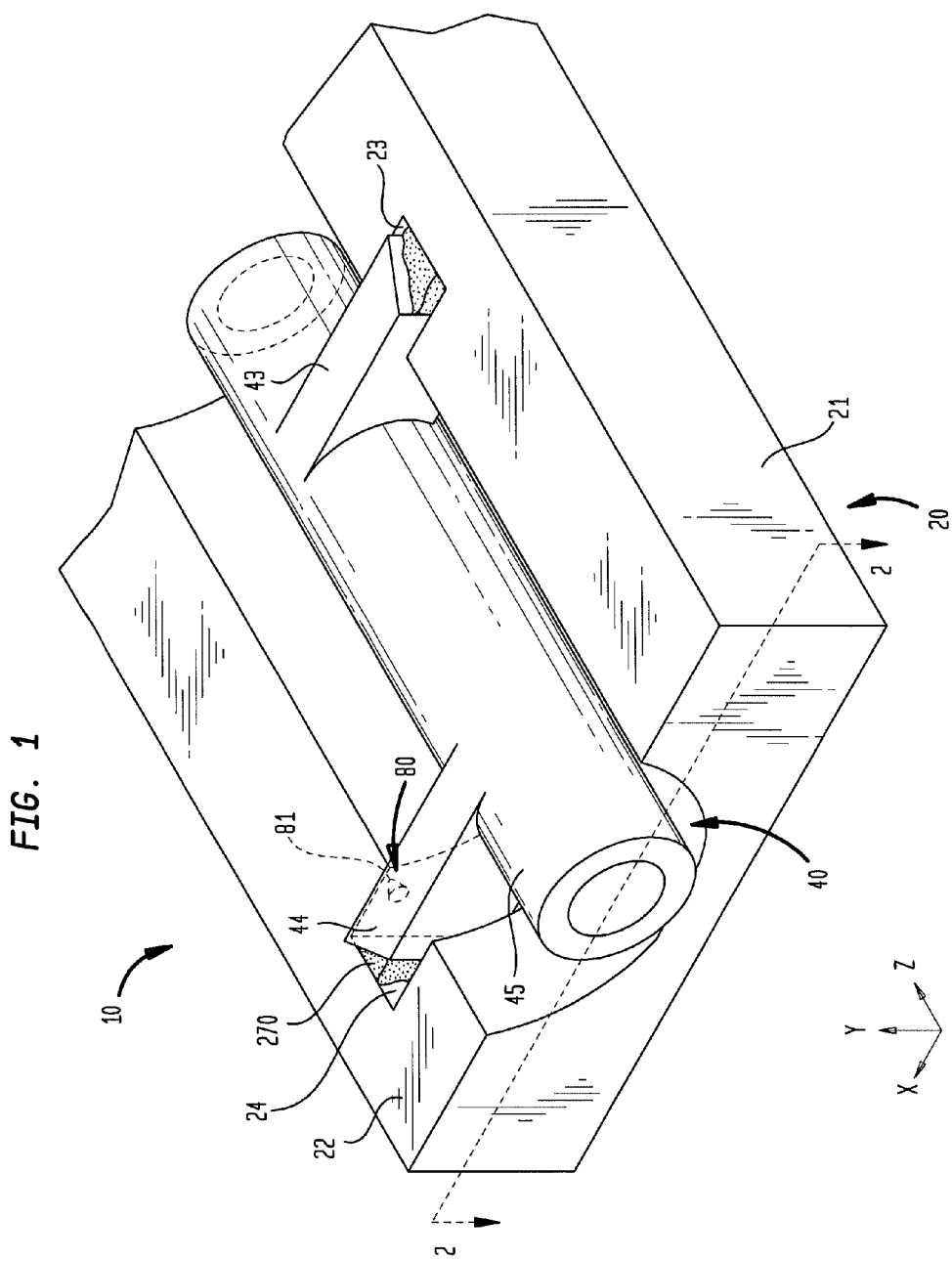
FIG. 1 is a perspective view of an apparatus for positioning an optical device, in accordance with an embodiment of the present invention.

In the Brief Summary of the Invention above and in the Detailed Description of the invention herein, and the claims below, and in the accompanying drawings, reference is made to particular features (e.g., method steps) of the invention. It is to be understood that the disclosure of the invention in this specification includes all possible combinations of such particular features. For example, where a particular feature is disclosed in the context of a particular aspect, arrangement, or embodiment of the invention, or a particular claim, that feature can also be used, to the extent possible, in combination with and/or in the context of other particular aspects, arrangements, and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can consist of not only components A, B, and C but also one or more other components. The term "step of" does not mean "step for".

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

The terms "lower," "upper," etc. and derived directional terms such as "horizontal", "vertical", "upward", and "downward" are based on a normal configuration of the apparatus described herein as shown in the drawings with reference to axes X, Y and Z that are orthogonal to each other, wherein the apparatus can be laid flat and elements within the apparatus may be removed in an upward direction. Accordingly, a Y-direction is parallel to the Y-axis and is in an up or down direction, a Z-direction is parallel to the Z-axis and is in a direction along a longitudinal axis of the apparatus, and an X-direction is parallel to the X-axis and is in a direction transverse to the longitudinal axis of the apparatus (Z-direction) and the up or down directions (Y-direction).

The present invention provides for an apparatus for positioning an optical device at a desired position, by movement of the optical device in one or more of the X, Y and Z-directions to obtain the desired position, and which provides that the desired position of the optical device within the apparatus may be maintained. The optical device that may be positioned and maintained at a desired position using the apparatus of the present invention, for example, may be an optical fiber, such as a single mode optical fiber, or any optical element for which alignment may be desired, such as LEDs, lasers, light bulbs, lenses, sensors, holographic optical elements, diffractive optics, apertures, linear arrays, area arrays, position sensitive detectors, single element detectors, or the like.

In accordance with aspects of the invention, the apparatus may include (i) a holder assembly for holding an optical device and for limiting movement of the optical device within the holder assembly to movement in the Z-direction and (ii) a housing permitting limited movement of the holder assembly in the X-direction, for supporting and optionally permitting movement of the holder assembly in the Y-direction, and for substantially preventing movement of the holder assembly in the Z-direction, in coordination with certain features of the holder assembly described further herein. When the holder assembly optionally holding the optical device is positioned with respect to the housing to obtain a desired position of the optical device, a bonding material may be used for fixing the location in the X-direction, and optionally the Y-direction, of the holder assembly within the housing. A method of operating the apparatus for obtaining a desired position of an optical device is further provided in accordance with aspects of the present invention.

Referring now to the drawings, FIG. 1 shows an embodiment of an apparatus 10 adapted to enable positioning of an optical device in the X-direction and Z-direction while also providing outer limits on the movement of the optical device in the X- and Z-directions. In addition, the apparatus 10 may be adapted to enable positioning of the optical device in the Y-direction. In this embodiment, the apparatus 10 may have a housing 20 that serves as an outer body for limiting the possible range of movement of a movable holder assembly 40 when the holder assembly 40 is received within the housing 20. The housing 20 may have two slot regions 23, 24, arranged so that dimensions of the regions 23, 24 extending in a direction parallel to the Z-axis are not aligned with each other in a direction parallel to the X axis, and an opening or central cavity 25. The holder assembly 40 has two flange members 43, 44 that are adapted to fit within the slot regions 23, 24, respectively, and a projection member 45 that is adapted to fit within the central cavity 25.

Figure 2:
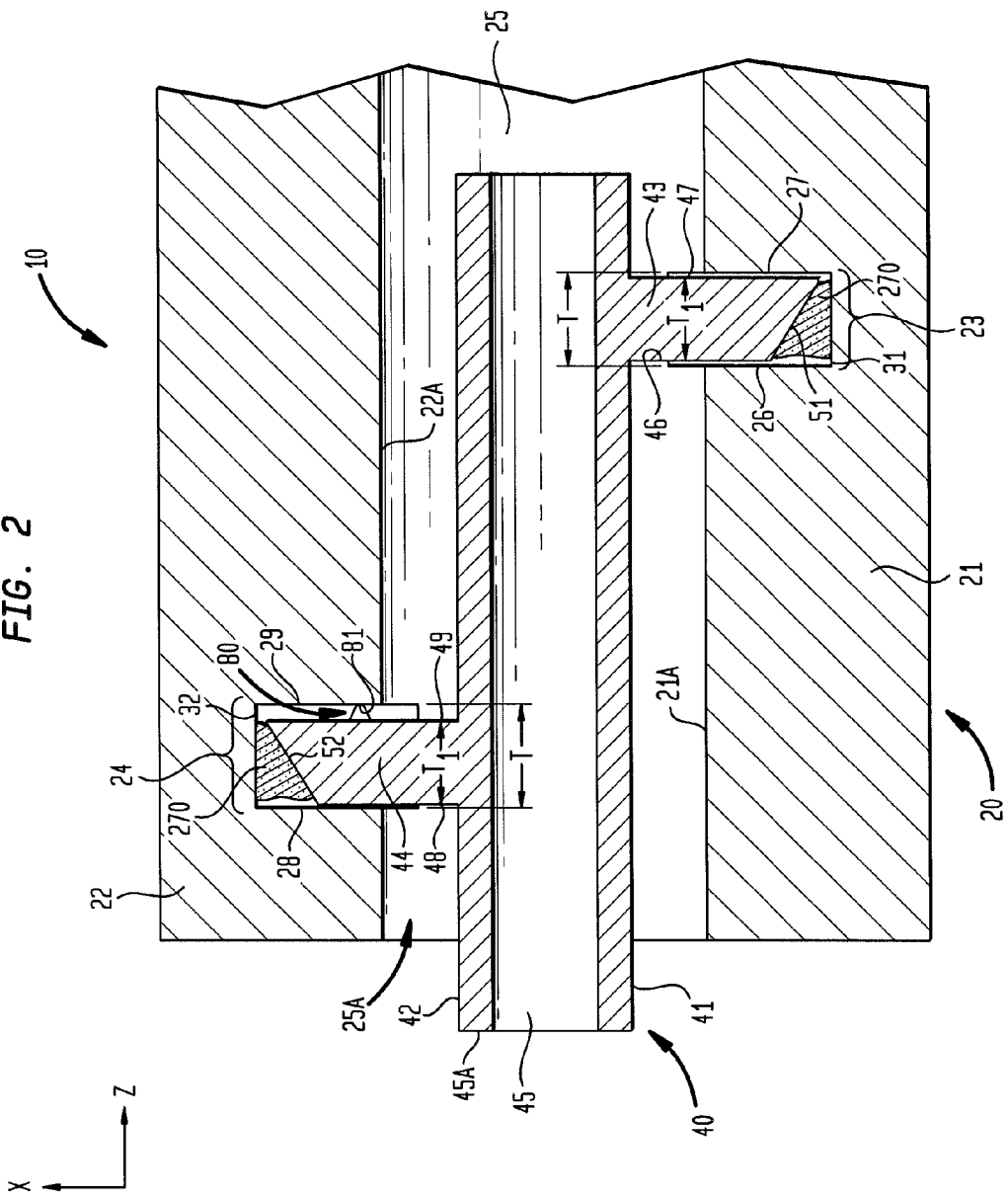
FIG. 2 is a cross-sectional plan view of the apparatus shown in FIG. 1

As illustrated in the cross-sectional view of FIG. 2, the housing 20 may have opposing first and second members 21, 22. In the arrangement shown, the first and second members 21, 22 define, respectively, the slot regions 23, 24 which extend from inner walls 21A, 22A of the first and second members 21, 22, respectively. The slot region 23 of the first member 21 is positioned further from a mouth 25A of the cavity 25 than the slot region 24 of the second member 22, although either of the slot regions 23, 24 may be positioned any distance from the mouth 25A. The slot region 23 of the first member 21 is defined by opposing first and second inner surfaces 26, 27 of the first member 21, which are oriented in a direction substantially perpendicular to a longitudinal axis through the apparatus 10 that extends in a direction parallel to the Z-direction and are spaced apart substantially a distance T, and an inset surface 31 of the first member 21 intersecting the first and second inner surfaces 26, 27. Similarly, the slot region 24 of the second member 22 is defined by opposing first and second inner surfaces 28, 29 spaced apart substantially the distance T and an inset surface 32 of the second member 22 intersecting the surfaces 28, 29.

Figure 3:
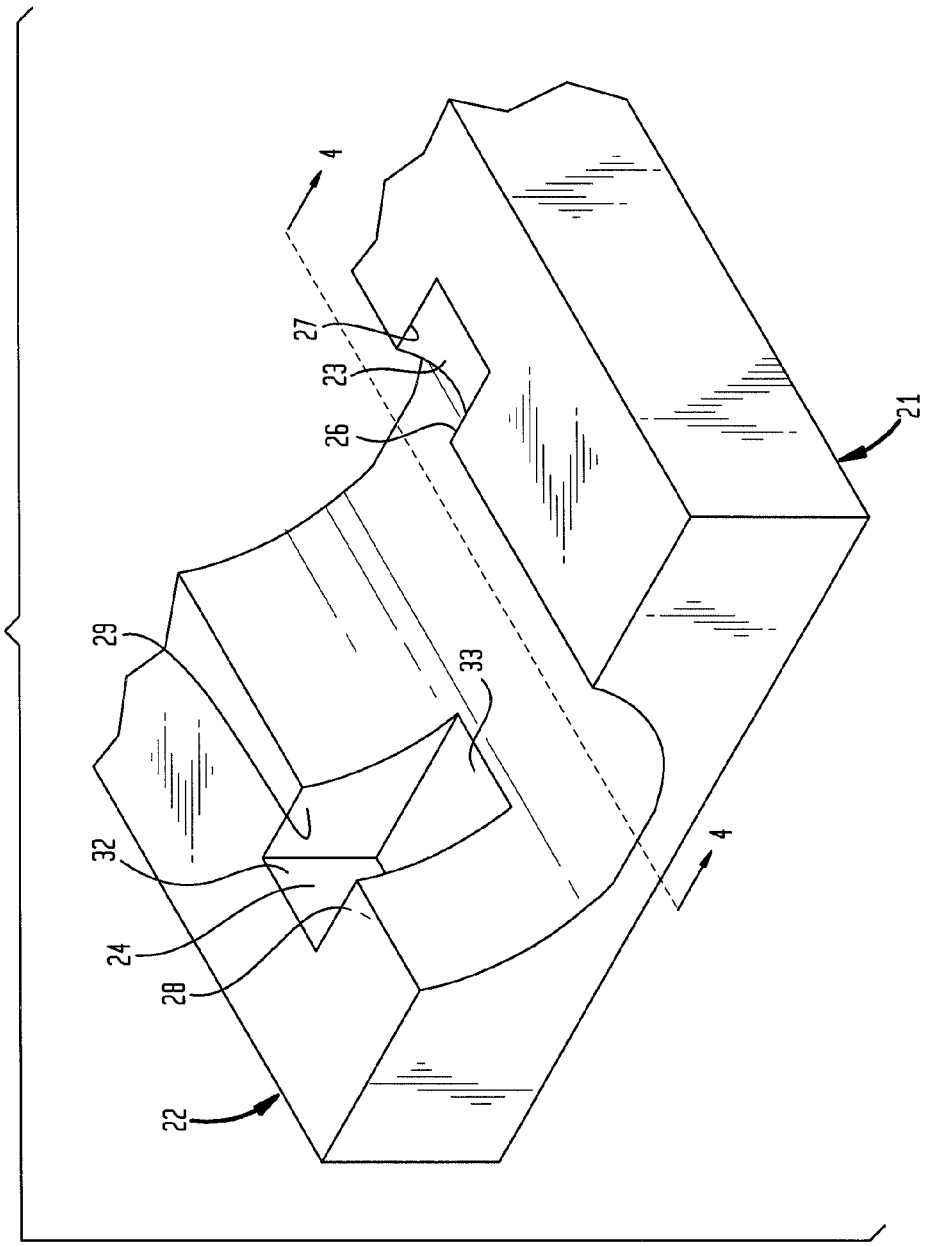
FIG. 3 is a perspective view of a housing of the apparatus shown in FIG. 1.
Figure 4:
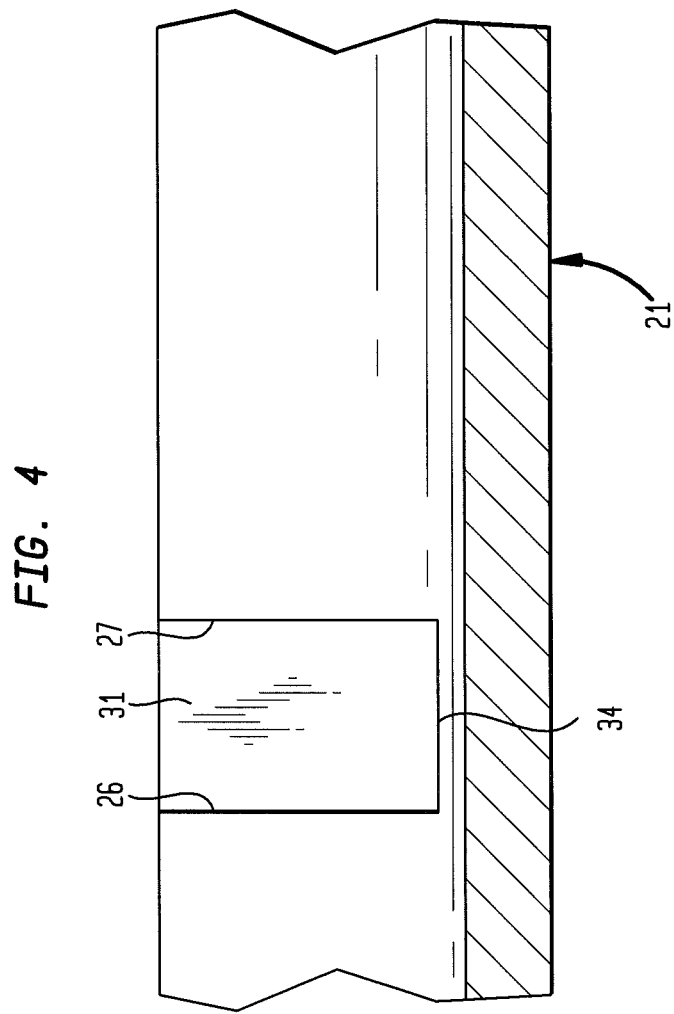
FIG. 4 is a cross-sectional side view of a portion of the housing shown in FIG. 3.

In addition, the slot regions 23, 24 may have corresponding base surfaces 33, 34. As shown in FIGS. 3 and 4, each base surface 33, 34 is positioned between and intersects the corresponding parallel inner surfaces 26, 27 and 28, 29 and inset surface 31, 32, respectively. In alternative embodiments, the apparatus 10 may not include a base surface. For example, the slot regions 23, 24 may extend vertically completely through the housing such that a surface on which the apparatus 10 rests may serve to maintain the position of the holder assembly 40 in the Y-direction. For practical purposes, positioning of the apparatus 10 in the X-direction and the Y-direction cannot be maintained without a base, such as the base surfaces 33, 34, which provides support for the holder assembly 40.

Again referring to the arrangement shown in FIG. 2, the projection member 45 of the holder assembly 40 may have first and second opposing surfaces 41, 42 capable of fitting within the central cavity 25 which is between the first and second members 21, 22 of the housing 20. The central cavity 25 may extend in the Z-direction from the mouth 25A of the housing 20 to a distance at least equal to a length of the holder assembly 40 in the Z-direction. The two flange members 43, 44 of the holder assembly 40 extend from and in a direction normal to the projection member 45. The first flange member 43 may be further from a front end 45A of the projection member 45, at which an optical device (not shown) may be inserted into and moved in the Z-direction within the projection member 45, than the second flange member 44. The first flange member 43 has opposing first and second parallel surfaces 46, 47 spaced apart a distance $T_1$, which is substantially the distance T, and an end surface 51 intersecting the first and second surfaces 46, 47 that may be parallel to one another. Likewise, the second flange member 44 has opposing first and second parallel surfaces 48, that may be parallel to one another and spaced apart a distance $T_2$ and an end surface 52 intersecting the first and second surfaces 48, 49 of the flange member 44.

The lengths of the parallel surfaces 46, 47 and 48, 49 in the X-direction, as well as in the Y-direction, may be unequal. Referring to FIGS. 1 and 2, in one embodiment, on a portion of at least one of the surfaces 46-49 may be an element 80 projecting from at least one of the surfaces 46-49 and terminating at a surface 81. The surface 81 may be a surface substantially forming a point. As shown in FIGS. 1 and 2, the surface 81 is spaced a distance $T_1$ from and parallel to the first surface 48.

As can be seen in FIG. 2, the slot region 23 of the first member 21 of the housing 20 may be adapted to receive the first flange member 43 of the holder assembly 40, and similarly the slot region 24 of the second member 22 of the housing 20 may be adapted to receive the second flange member 44 of the holder assembly 40. When the holder assembly 40 is inserted into the housing 20, so the flange members 43, 44 respectively are received in the slot regions 23, 24, and moved in the X-direction, the flange members 43, 44 may be moved in a direction substantially parallel to the planes in which the parallel inner surfaces 26-29 of the first and second members 21, 22 of the housing 20 extend. The housing 20 and the holder assembly 40 are adapted, such that when the holder assembly 40 is inserted as described above into the housing 20 and moved in the X-direction toward either of the first housing member 21 or second housing member 22, at least a parallel portion of the opposing parallel surfaces 46, 47 of the flange member 43 faces at least a parallel portion of the parallel inner surfaces 26, 27 of the first housing member 21, and at least a parallel portion of the opposing parallel surfaces 48, 49 of the flange member 44 faces at least a parallel portion of the parallel inner surfaces 28, 29 of the second housing member 22. Referring again to FIGS. 1 and 2, in one embodiment, when the holder assembly 40 is inserted into the housing 20, one of the parallel portions of the opposing surfaces 46-49 that faces the parallel portions of the inner surfaces 26-29 may be the surface 81.

In one embodiment, a minimum clearance $T-T_1$ between the parallel inner surfaces 26-29 and the corresponding opposing surfaces 46-49 is within the range of about 5-100 µm, and desirably within the range of about 10-20 µm. In still another embodiment, when the holder assembly 40 is inserted into the housing 20, a minimum distance in the X-direction over which the parallel inner surfaces 26-29 of the slot regions 23, 24 and the corresponding surfaces 46-49 of the flange members 43, 44 face each other during any movement of the holder assembly 40 is about 50-1000 µm, and more desirably about 50-500 µm.

In an embodiment having the base surfaces 33, 34, the base surfaces 33, 34 may be capable of contacting a holder assembly 40 to limit the movement of the holder assembly 40 in the downward direction, which limitation is in addition to limitations the housing 20 places on the movement of the holder assembly 40 in the X-direction and Z-direction.

In another embodiment, the inset surfaces 31, 32 may be located the same distance from the longitudinal axis of the apparatus 10 where a centerline of the holder assembly 40 is located on the longitudinal axis of the housing 20. Arrangements in which the respective inset surfaces are located at different distances from the longitudinal axis are also within the scope of this invention. In this regard, the lengths of the parallel surfaces 26-29 of the slot regions 23, 24 may be unequal.

Other arrangements may provide different or additional limitations on the movement of the holder assembly 40 in the X-direction relative to the housing 20 when the holder assembly 40 is inserted into the housing 20. In one such arrangement, the parallel portions of the inner surfaces 26-29 of the housing and the parallel portions of the respective surfaces 46-49 of the holder assembly 40 may face one another when the holder assembly 40 is moved toward the inset surfaces 31, 32. The distance the projection member 45 is movable in the X-direction may correspond to the distance that the flange members 43, 44 are movable in the X-direction toward the inset surfaces 31, 32 of the adjacent housing members 21, 22, and such distance may be within the range of about 50-1000 µm. In a further arrangement, one of the inner surfaces 26-29 of the slot regions 23, 24 of one of the housing members 21, 22 may have a length D from the corresponding inset surface 31, 32 in the X-direction that exceeds a maximum distance the holder assembly 40, when positioned within the slot region 23, 24, is movable towards the inset surface 31, 32 of the slot region 23, 24 of the other housing member 21, 22. These limitations may also be present in other arrangements in accordance with the present invention. Furthermore, these features are merely illustrative of the possible movement restrictions within the scope of the invention and are not intended to be limiting.

Referring again to FIGS. 1 and 2, after the holder assembly 40 is positioned in the housing 20 to obtain a desired position of an optical device held therein based on movement of the holder assembly 40 in the X-direction, a bonding material 270 may be supplied to occupy empty spaces within the slot regions 23, 24. The bonding material may be disposed between each of the inset surfaces 31, 32 of the slot regions 23, 24 and the corresponding end surfaces 51, 52 of the flange members 43, 44. In one arrangement, the bonding material 270 may be adhered to the inset surface 31, 32 and the opposing end surface 51, 52. In another arrangement, the bonding material may also be adhered to only at least one of the base surfaces 33, 34 and the corresponding opposing end surface or surfaces 51, 52, or to at least one of the base surfaces 33, 34 in addition to the corresponding inset surface or surfaces 31, 32 and the corresponding opposing end surface or surfaces 51, 52.

The bonding material 270 desirably may maintain a bond with the surfaces it contacts. When the optical device held within the inventive apparatus is subjected to temperatures that typically range from −40° C. to +85° C., and reach as high as 100° C., as may be expected during operation of the optical device, it is to be appreciated that the bond strength of the bonding material 270 may deteriorate. The construction of the inventive apparatus, however, may advantageously provide for the bonding material, despite potential degradation so as to no longer bond portions of the holder assembly 45 to the housing 20, to limit the movement of the holder assembly 45 in the X-direction. The bonding material 270 in the slot regions 23, 24 in an installed state of the material 270 following hardening or curing, may be a substantially rigid structure extending between the housing 20 and the flange members 43, 44 of the holder assembly 40 in the X-direction that serves to substantially or completely prevent movement of the holder assembly 40 in either of the slot regions 23, 24 in the X-direction. In one arrangement, the amount of the bonding material 270 in the slot regions 23, 24 is sufficient to substantially prevent any movement by the holder assembly 40 in the event that the bonding material 270 no longer has a bond with any of the surfaces of the housing 20 or holder assembly 40 by physically obstructing all or nearly all such movement.

Figure 5:
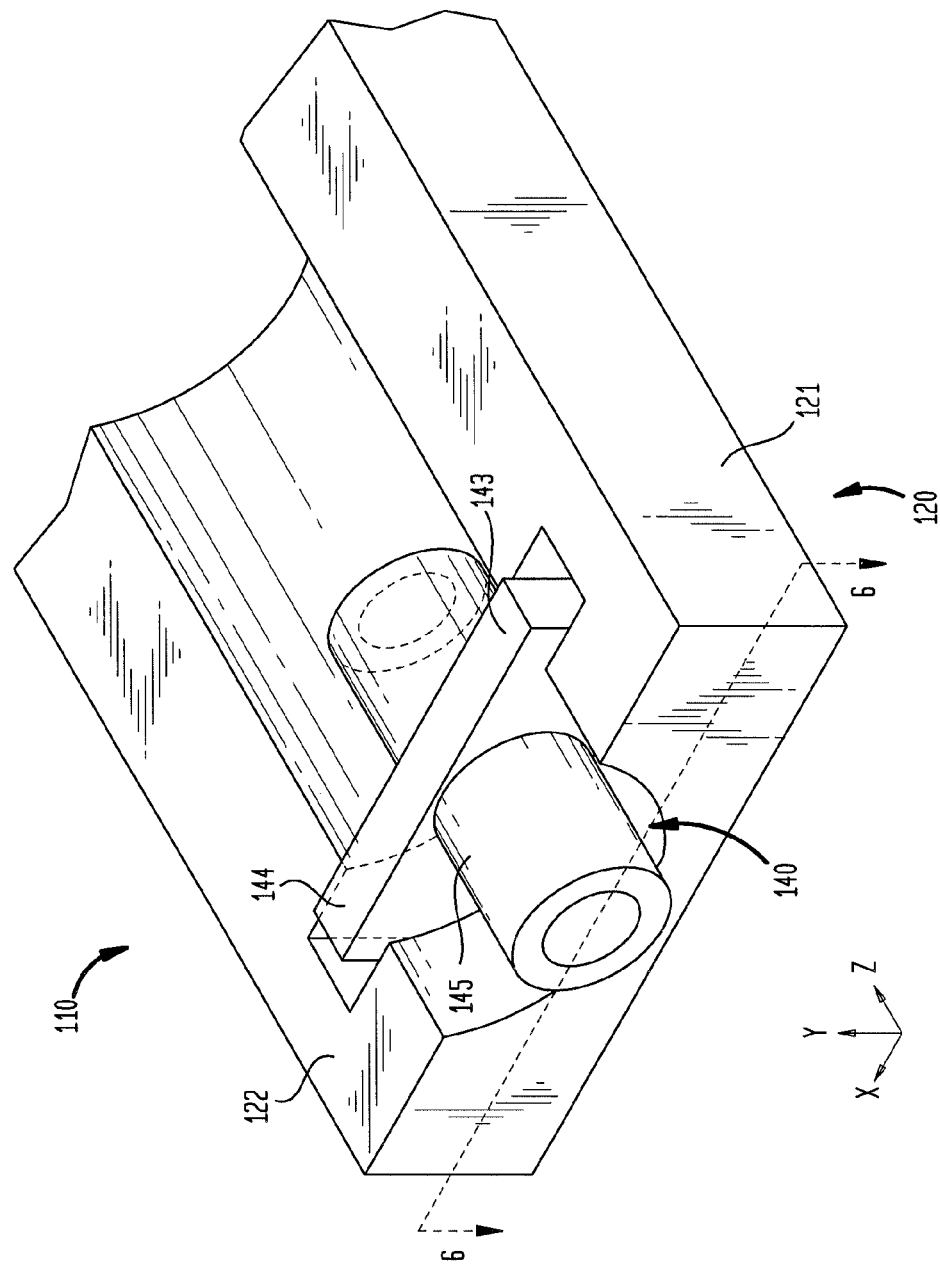
FIG. 5 is a perspective view of an apparatus for positioning an optical device, in accordance with another embodiment of the present invention.
Figure 6:
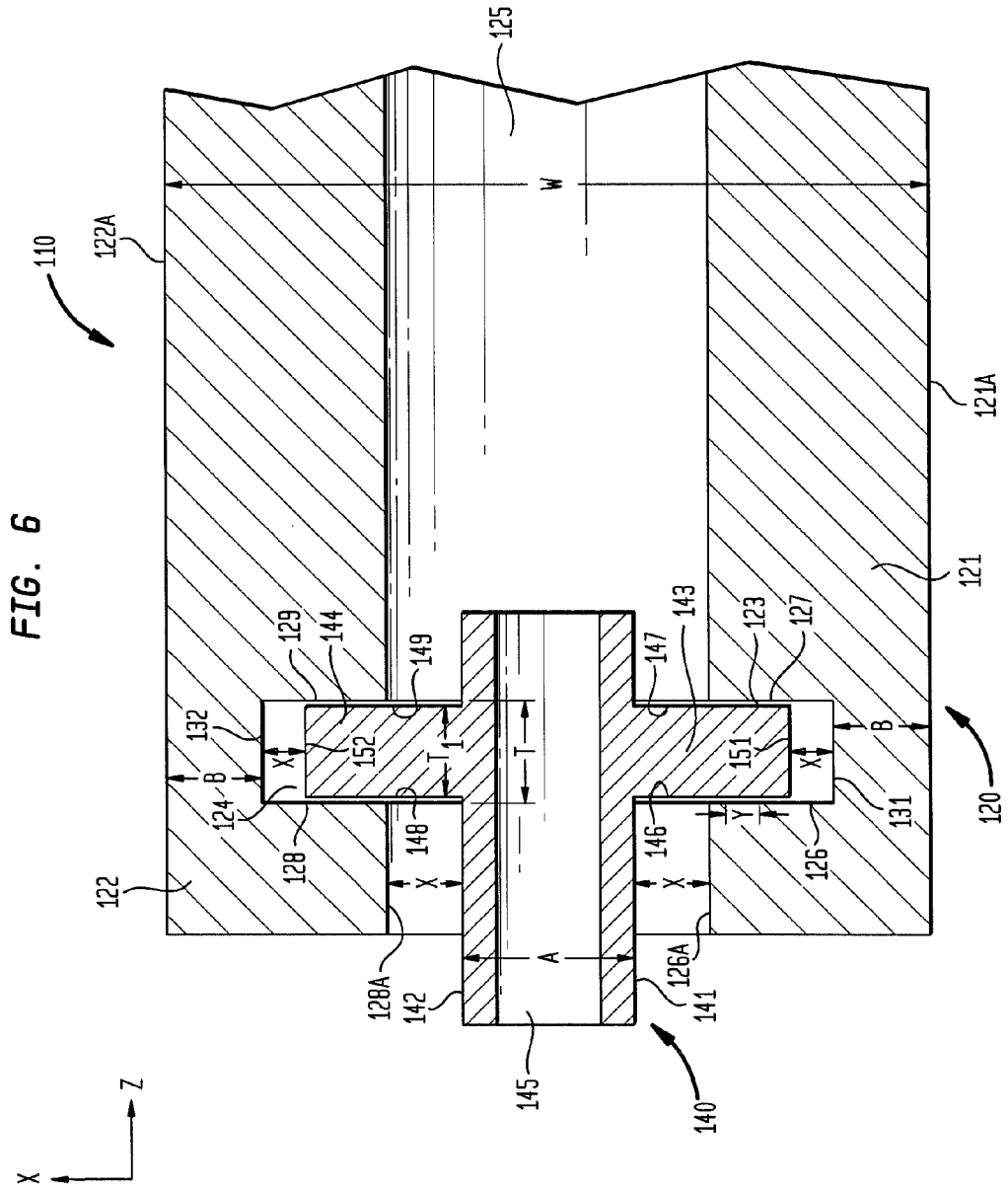
FIG. 6 is a cross-sectional plan view of the apparatus shown in FIG. 5.

FIGS. 5 and 6 show an embodiment of a positioning apparatus 110 having slot regions whose dimensions extending in a direction parallel to the Z-axis are aligned in a direction parallel to the X axis. As shown in these figures, the positioning apparatus 110 shares many of the same features as the apparatus 10 shown in FIGS. 1 and 2. Similar to the apparatus 10 and as best seen in the cross-sectional view in FIG. 6, the apparatus 110 may have a housing 120 with two members 121, 122 having slot regions 123, 124 and a holder assembly 140 that includes a projection member 145 for holding an optical device (not shown) inserted therein, and two flange members 143, 144 extending in a direction perpendicular from opposing end surfaces 151, 152 to the projection member 145. The slot regions 123, 124 of the housing 120 have inset surfaces 131, 132, and first and second parallel inner surfaces 126, 127 and 128, 129, the first surfaces 126, 128 and the second surfaces 127, 129, respectively, being in substantially a same plane and oriented in a direction substantially perpendicular to a longitudinal axis of the apparatus 110 as in the apparatus 10. The flange members 143, 144 of the holder assembly 140 have corresponding end surfaces 151, 152, and first and second parallel surfaces 146, 147 and 148, 149, the first surfaces 146, 148 and the second surfaces 147, 149, respectively, being in a same plane and oriented in a direction substantially perpendicular to the longitudinal axis of the apparatus 110. In this arrangement, the respective first and second parallel surfaces 146, 147 and 148, 149 of the flange members 143, 144 and the first and second parallel inner surfaces 126, 127 and 128, 129 are spaced apart substantially the distance T. Similarly as described above for the apparatus 10, a desired minimum clearance between the parallel inner surfaces of the slot regions and the corresponding opposing parallel surfaces of the flange members is within the range of 5-100 μm and desirably within the range of about 10-20 μm, when the flange members 143, 144 are within the slot regions 123, 124, respectively. The projection member 145 further may have first and second opposing surfaces 141, 142 capable of fitting within a central cavity 125 situated between the first and second members 121, 122 of the housing 120.

As best seen in FIG. 6, the slot region 123 of the first member 121 of the housing 120 is capable of receiving the first flange member 143, and similarly the slot region 124 of the second member 122 of the housing 120 is capable of receiving the second flange member 144 of the holder assembly 140. Similar to the apparatus 10, at least a portion of the parallel inner surfaces 126, 127 and 128, 129 and at least a portion of the corresponding opposing parallel surfaces 146, 147 and 148, 149 of the positioning apparatus 110, respectively, face one another when the holder assembly 140 is inserted in the housing 120 and moved in the X-direction. In another arrangement, as in the apparatus 10, the inset surfaces 131, 132 are located the same distance from the longitudinal axis of the apparatus 110 when a centerline of the holder assembly 140 is located on the longitudinal axis of the housing 120.

Alternative arrangements of this embodiment may also provide limitations on the movement of the holder assembly 140 in the X-direction when the holder assembly 140 is inserted in the housing 120. In one such arrangement, at least a portion of the inner surfaces 126, 127 and 128, 129 of the housing 120 and at a least a portion of the parallel surfaces 146, 147 and 148, 149 of the holder assembly 140 of the apparatus 110, respectively, may face one another when the holder assembly 140 is moved toward the inset surfaces 131, 132. In one embodiment, the portion on the surfaces 146-149 facing the respective inner surfaces 126-129 may be an element projecting from the inner surface and terminating at a surface, including a surface substantially forming a point, which may be parallel to the corresponding opposing inner surface. In another arrangement, the distance the projection member 145 is movable in the X-direction may be limited to the distance that the flange members 143, 144 are movable toward the inset surfaces 131, 132 of the adjacent housing members 121, 122.

In another alternative arrangement, the parallel inner surfaces 126-129 of the slot region of one of the housing members 121, 122 may have a length D from the corresponding inset surface 131, 132 in the X-direction that is greater than a maximum distance the holder assembly 140 is movable towards the inset surface 131, 132 of the slot region 143, 144 of the adjacent housing members 121, 122.

In one embodiment of the apparatus 110 illustrated in FIG. 6, the first and second members 121, 122 of the housing 120 may further include opposing side surfaces 121A, 122A spaced a distance W apart and forward interior surfaces 126A, 128A adjacent to and intersecting the corresponding first inner parallel surfaces 126, 128 of the housing members 121, 122. In this embodiment, (i) the opposing surfaces 141, 142 of the projection member 145 of the holder assembly 140 are spaced apart a maximum distance A, (ii) the opposing side surfaces 121A, 122A are spaced apart a minimum distance B in the X-direction from the corresponding inset surfaces 131, 132 of the housing members 121, 122, (iii) the end surfaces 151, 152 of the flange members 143, 144 of the holder assembly 140 are spaced apart a minimum distance X from the corresponding inset surfaces 131, 132 in the X-direction when the flange members 143, 144 of the holder assembly 140 are inserted into the slot regions 123, 124 of the housing, and (iv) the opposing surfaces 141, 142 of the projection member 145 are spaced apart a minimum distance X in the X-direction from the corresponding forward interior surfaces 126A, 128A when the holder assembly 140 is placed within the central cavity 125 of the housing 120. Furthermore, the parallel inner surfaces 126-129 of the housing members 121, 122 and the corresponding parallel surfaces 146-149 of the flange members 143, 144 face one another over a minimum distance Y of any one of the parallel inner surfaces 126-129 extending in the X-direction regardless of the position of the holder assembly 140 with respect to the housing 120 in the X-direction, such that the minimum of distance W=A+2B+2 (3X+Y).

In contrast to the arrangement of apparatus 10, in the arrangement shown in FIGS. 5 and 6, the dimensions of the flange members 143, 144 of the housing 120 extending in a direction parallel to the longitudinal axis of the holder assembly 140 are aligned in a direction parallel to the X-axis, and the slot regions 123, 124 of the holder assembly 140 are also aligned in the X-axis direction as described above. Therefore, when the holder assembly 140 is received in the housing 120, the flange members 143, 144 and the slot regions 123, 124 are in alignment with one another in a direction parallel to the X-axis. Furthermore, the inset surfaces 131, 132 are parallel to the longitudinal axis and thus all points along the inset surfaces 131, 132 are equidistant from the longitudinal axis.

Figure 7:
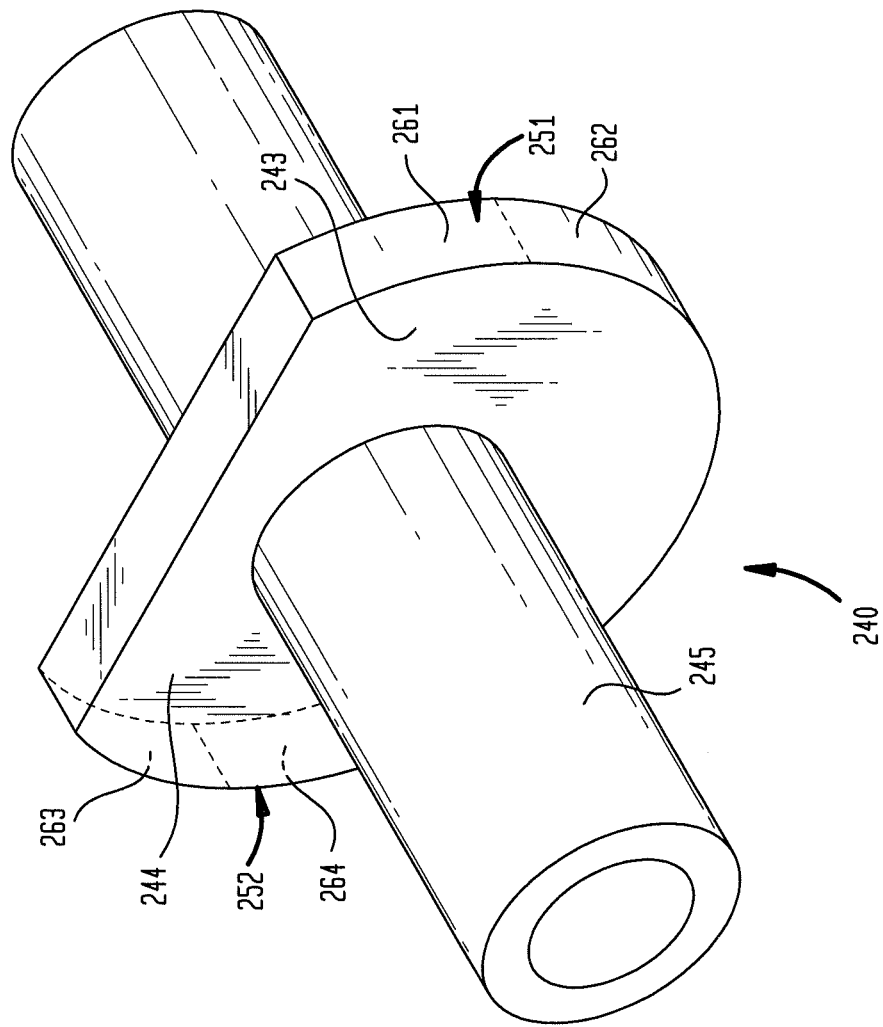
FIG. 7 is a perspective view of a holder assembly of an apparatus in accordance with another embodiment of the present invention.

FIG. 7 illustrates a holder assembly 240 in accordance with an embodiment of the invention. Such a holder assembly 240 may have similar features to the holder assembly arrangements previously discussed and may further have an end surface 251 on a first flange member 243 that includes corresponding first and second portions 261, 262 and an opposing end surface 252 on a second flange member 244 that includes corresponding first and second portions 263, 264. In such an arrangement, the first and second portions 261-264 of each end surface 251, 252 may be adjacent to each other. The first portions 261, 263 may extend from intersections of the first and second portions 261, 262 and 263,264, respectively, on an outer surface of each flange member 243, 244 towards a centerline of the holder assembly 240 which extends in a direction parallel to the X-axis. The second portions 262, 264 may be capable of insertion into housing slot regions, such as the slot regions 23, 24 of the housing 20. When the holder assembly 240 is inserted into housing slot regions, each first portion 261, 263 may be above each second portion 262, 264 such that each first portion 261, 263 is located a greater distance from a corresponding base surface, such as the base surfaces 33, 34 of the apparatus 10, than each second portion 262, 264. Each of the first portions 261, 263 also may be further from corresponding inset surfaces, such as the inset surfaces 31, 32, than each of the second portions 262, 264.

Various other arrangements of the first and second portions 261-264 are possible. For example, each of the first portions 261, 263 of each of the end surfaces 251, 252 may extend from each of the second portions 262, 264. Each of the first portions 261, 263 may also have an arcuate or rounded shape or may be a chamfer extending from an intersection of the first and second portions 261, 262 and 263, 264, respectively, in which the points along each of the first portions 261, 263 furthest from a corresponding base surface, such as the base surfaces 33, 34 of the housing 20, are also furthest from a corresponding inset surface of a housing, such as the inset surfaces 31, 32 of the housing 20.

The bonding material 270 may limit the Y-direction movement of the holder assembly instead of or in addition to limiting X-direction movement as previously described. In one such arrangement, the base surface, such as the base surfaces 33, 34 of the housing 20, may provide a barrier to movement in the downward direction for not only a holder assembly, such as the holder assembly 40 or the holder assembly 140, but also for the bonding material 270. In this manner, either or both of the base surfaces 33, 34 may be arranged such that they enable the bonding material 270 to remain substantially in contact with either or both of the first portions 261, 263 or the second portions 262, 264 of a holder assembly, such as the holder assembly 40. In other words, the base surface 33, 34 may provide a foundation for a sufficient amount of bonding material within the corresponding slot region 23, 24 such that it contacts either or both of the first portions 261, 263 or the second portions 262, 264. The bonding material may be various materials such as an epoxy-based, acrylic-based, or urethane-based adhesive or a solder.

It is further to be appreciated that the invention set forth herein includes within its scope a method for using the apparatuses previously described. An embodiment for such a method may include various steps, the order of which that is heretofore discussed is not intended to be limiting. In this embodiment, first and second flange members of a holder assembly, such as the flange members 43, 44 of the holder assembly 40, may be inserted into respective slot regions, such as the slot regions 23, 24, each having two inner parallel surfaces and an inset surface, such as the parallel inner surfaces 26-29 and the inset surfaces 31, 32. It is assumed that the holder assembly holds an optical device and that the optical device has been moved in the Z-direction within the holder assembly to obtain a desired Z-direction position of the optical device, and the optical device has been fixed to the assembly at the desired Z-direction position by an adhesive bonding the optical device to an inner surface of an aperture in a projection member of the holder assembly in which the optical device is received. The holder assembly, with the optical device fixed therein, may be moved in the direction of the inset surface of either the first member or the second member to obtain a desired position in the X-direction of the holder assembly, and thus a desired X-direction position of the optical device.

A bonding material, such as the bonding material 270, may then be applied within a space between at least one of the inset surfaces and the end surface of the flange member opposing the inset surface when the holder assembly is in the desired position. The bonding material may also be applied between a base surface, such as the base surfaces 33, 34, and the end surface of the flange member.

When a sufficient amount of bonding material is applied in an appropriate manner between the end surfaces of the holder assembly and the corresponding inset surfaces of the housing members, the bonding material, desirably following hardening by curing or the like, may limit the movement of the holder assembly in the X- and Y-directions. As previously explained, the bonding material is capable of limiting the movement of the holder assembly when it is bonded with the surfaces of the holder assembly and housing, and also when it is not bonded with one or both of the housing and holder assembly, such as may occur when the bonding material becomes deteriorated, because the bonding material serves as both an adhesive and a physical obstruction. In this manner, the inventive apparatus of the present invention provides a significant advantage over the prior art by providing that an optical device held within a positioning apparatus that is installed in an optical system may remain substantially at a desired position at which the device is positioned in the positioning apparatus before application of the bonding material to bond the housing to the holder assembly, despite any deterioration of the bonding material used to fix the position of the optical device within the positioning apparatus, thereby greatly improving the reliability of the intended function of the optical device in the optical system.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of operating an apparatus for positioning an optical device comprising the steps of:

inserting first and second flange members of a holder assembly for holding an optical device into respective slot regions of first and second members of a housing, wherein each of the members of the housing has (i) opposing first and second inner surfaces, wherein at least portions respectively of the first and second inner surfaces are parallel and spaced apart a distance T, and (ii) an inset surface, the inner surfaces and the inset surface defining the slot region in each of the members, wherein the portions of the four inner surfaces extend in planes parallel to one another, wherein the holder assembly includes a projection member having opposing surfaces, each of the flange members having an end surface opposing one of the inset surfaces of the housing and opposing first and second surfaces extending from the opposing surfaces of the projection member, wherein at least portions respectively of the first and second surfaces are parallel and spaced substantially the distance T from each other, wherein the opposing surfaces of the projection member are capable of fitting between the first and second members, and wherein the housing is adapted to receive the holder assembly in the slot regions such that, when the holder assembly is seated in the slot regions, the parallel surface portions of the first and second flange members face the parallel inner surface portions of the first and second members, respectively, and are movable in one of a first and a second direction of the inset surface of the first and second member, the first and second directions being substantially parallel to the planes in which the inner surfaces of the first and second members extend toward the inset surface of the first member or the second member; and moving the holder assembly in one of the first and second directions to a desired position of the holder assembly when the holder assembly is seated in the slot regions; and applying an amount of material within a space between each of the inset surfaces of the housing and the end surfaces of the flange members opposing the respective inset surfaces, when the holder assembly is in the desired position, such that the material substantially limits movement in the first and second directions by the holder assembly by physically obstructing such movement without the material being adhesively bonded to the housing.

2. The method of claim 1, wherein the material is a cured epoxy.

3. The method of claim 1, wherein the material is a bonding material adherable to at least one of the inset surfaces and the opposing end surfaces.

4. A method of operating an apparatus for positioning an optical device comprising the steps of:

inserting first and second flange members of a holder assembly for holding an optical device into respective slot regions of first and second members of a housing, wherein each of the members of the housing has (i) opposing first and second inner surfaces, wherein at least portions respectively of the first and second inner surfaces are parallel and spaced apart a distance T, (ii) an inset surface and (iii) a base surface from which the inset surface and the parallel inner surfaces extend, wherein the parallel inner surfaces, the base surface and the inset surface define the slot region in each of the members, wherein the portions of the four inner surfaces extend in planes parallel to one another, wherein the holder assembly includes a projection member having opposing surfaces, each of the flange members having an end surface and opposing first and second surfaces extending from the opposing surfaces of the projection member, wherein at least portions respectively of the first and second surfaces are parallel and spaced a distance T from each other, wherein the opposing surfaces of the projection member are capable of fitting between the first and second members, and wherein the housing is adapted to receive the holder assembly in the slot regions such that, with the holder assembly in the slot regions, at least a portion of the first and second flange members respectively faces at least a portion of the inner surfaces of the first and second members;

moving the holder assembly in a direction toward or away from the base surface of at least one of the first and second members of the housing to obtain a desired position of the holder assembly, wherein at the desired position, a material space is defined between the base surface of the at least one of the first and second members of the housing and the at least one end surface of the corresponding first flange member or second flange member; and applying an amount of material within the material space such that the material limits movement of each of the flange members of the holder assembly in a direction toward or away from the base surface.

5. The method of claim 4, wherein the end surface of each of the first and second flange members includes a first portion and a second portion with the first portion of the end surface of each flange member spaced further from both the base surface and the inset surface of the housing adjacent thereto than the second portion of the end surface wherein, after the step of applying the material, the quantity of material is arranged in each of the slot regions to enable the material to remain substantially in contact with the first portion.

6. The method of claim 4, wherein the material is a bonding material that adheres to the end surface of each of the flange members and the corresponding base surface of each of the housing members.

7. The method of claim 4, wherein the material is a cured epoxy.

8. The method of claim 4, wherein the material limits movement of each of the flange members of the holder assembly in the direction toward the base surface by physically obstructing such movement without the material being adhesively bonded to the housing.

9. The method of claim 4, wherein the inset surfaces of the housing oppose respective ones of the end surfaces of the flange members, the method further comprising the step of:

applying an amount of material within a space between each of the inset surfaces of the housing and the end surfaces of the flange members opposing the respective inset surfaces, when the holder assembly is in the desired position, such that the material substantially limits movement by the holder assembly in first and second directions parallel to the planes in which the four inner surfaces extend by physically obstructing such movement without the material being adhesively bonded to the housing.

\* \* \* \* \*